United States Patent

Au

[15] 3,694,673

[45] Sept. 26, 1972

[54] FIELD EFFECT DEVICE AND CIRCUIT HAVING HIGH CURRENT DRIVING CAPABILITIES UTILIZING SUCH DEVICE

[72] Inventor: Kenneth K. Au, Ottawa, Ontario, Canada

[73] Assignee: Microsystems International Limited, Ottawa, Ontario, Canada

[22] Filed: March 15, 1971

[21] Appl. No.: 124,278

[52] U.S. Cl. ...........307/304, 317/235 B, 317/235 G, 330/35

[51] Int. Cl. ..........................H01l 11/14, H01l 19/00

[58] Field of Search .........317/235 B, 235 G; 330/35; 307/213, 304

[56] References Cited

UNITED STATES PATENTS 3,479,523 11/1969 Pleshko.....................307/304

FOREIGN PATENTS OR APPLICATIONS 1,566,559 3/1969 France.......................317/235

*Primary Examiner*—Jerry D. Craig
*Attorney*—L. Brooke Keneford

[57] ABSTRACT

High speed, high voltage swing, low output impedance clock circuit is described. The circuit is designed to provide high current drive and uses a novel field effect device to resistively couple supply voltage to output voltage. The invention further relates to the field effect device per se.

3 Claims, 7 Drawing Figures

BY L. Brooke Keneford

PATENT AGENT

BY

PATENT AGENT

FIELD EFFECT DEVICE AND CIRCUIT HAVING HIGH CURRENT DRIVING CAPABILITIES UTILIZING SUCH DEVICE

This invention relates to a field effect device and to a circuit having high current driving capabilities and utilizing such a device.

It is desirable when designing FET circuits for use as on-chip clock generators, output buffers, and similar circuits driving heavy loads that the output voltage should swing to the full supply voltage. Clearly, this requirement becomes particularly important where a low supply voltage is used. If the supply voltage is sufficiently high, it is possible to design a circuit using conventional FET devices which will swing the output voltage to the full supply voltage. However, it is often desirable that the supply voltage be low and in many cases of similar magnitude to the gate voltages of the devices. In such a case, it is difficult to swing the output voltage to the full supply voltage since the threshold voltage of the devices becomes significant and is limiting upon the output voltage, as will be hereinafter explained. In order to overcome this problem, it has been proposed to resistively couple the output to the supply voltage in order to derive the full voltage swing required. However, as will also be explained hereinafter, this creates a problem of space having regard to the physical characteristics of the FET devices employed in the circuit, which results in a necessity for the resistance to be of relatively high magnitude to permit the devices associated therewith to be kept to a reasonable size. Unfortunately, this high impedance between the supply voltage and the load gives a slow charging RC time constant which is also undesirable.

The object of the present invention is firstly to provide a circuit which combines the advantages of compact size and low output impedance of the typical non-resistively coupled circuit with the ability of the resistively coupled circuit to permit the output voltage to swing to the full supply voltage.

The second object of the invention is to provide a field effect device having high impedance current path associated therewith between the drain and source regions.

Briefly, the above objects are achieved by providing a distributed FET device having a diffused or deposited resistance network associated therewith. A further feature of the invention comprises utilizing such device in a circuit of the type described to couple the output to the supply voltage.

The invention will now be described further by way of example only and with reference to the following drawings wherein.

Figure 1:
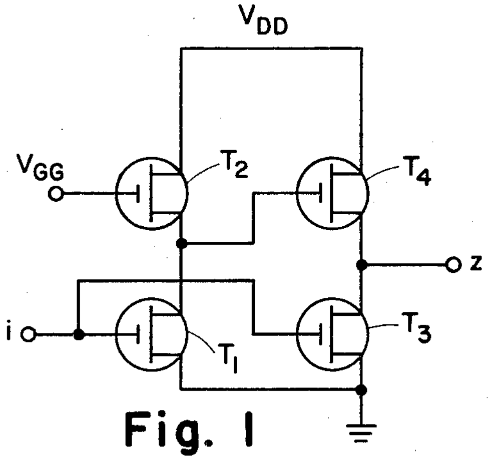
Fig. 1 (PRIOR ART)
FIGS. 1 and 2 show prior art circuits utilizing FET devices and having high current driving capabilities.

Referring now to the drawings, FIG. 1 shows a push-pull circuit utilizing metal oxide semiconductor devices (MOSFETS) and commonly employed in the art to provide a driver circuit for relatively heavy loads. Such a circuit commonly finds applicability as an on-chip clock generator, output buffer, etc. The circuit functions as follows.

Transistors $T_1$ and $T_2$ constitute a ratio inverter while transistors $T_3$ and $T_4$ are high gain devices constituting a ratioless push-pull stage. A constant gating voltage $V_{GG}$ is applied to the gate of transistor $T_2$ and the supply voltage $V_{DD}$ is applied to the drains of transistors $T_2$ and $T_4$. An input signal $i$ is applied to the gate of transistor $T_1$ and to the gate of transistor $T_3$ and the output voltage is derived from the source of transistor $T_4$. The source electrodes of transistors $T_1$ and $T_3$ are at ground potential. Since the circuit is a logic circuit, let us assume that the input signal $i$ will either be "0" or "1" (negative logic). When the input $i$ is 1, $T_1$ and $T_3$ conduct. Transistors $T_1$ and $T_2$ form a ratio inverter so that the node at the gate of $T_4$ is 0 and $T_4$ is therefore disabled. Clearly, the output voltage $z$ will also be 0 since such voltage is derived from the source of transistor $T_4$. When the input $i$ is 0, $T_1$ and $T_3$ are disabled. Transistor $T_2$ is enabled by the gate voltage $V_{GG}$ and therefore the potential applied to the gate of $T_4$ is at $V_{DD}$ which enables $T_4$. However, because transistor $T_4$ has a finite threshold voltage $V_T$, the output z will not go to the full supply voltage $V_{DD}$ but will only go to $V_{DD} - V_T$. This is assuming that the gate voltage $V_{GG}$ on transistor $T_2$ is less than the supply voltage $V_{DD}$ by at least the threshold voltage $V_T$, i.e. $V_{GG} \leq V_{DD} + V_T$.

Figure 2:
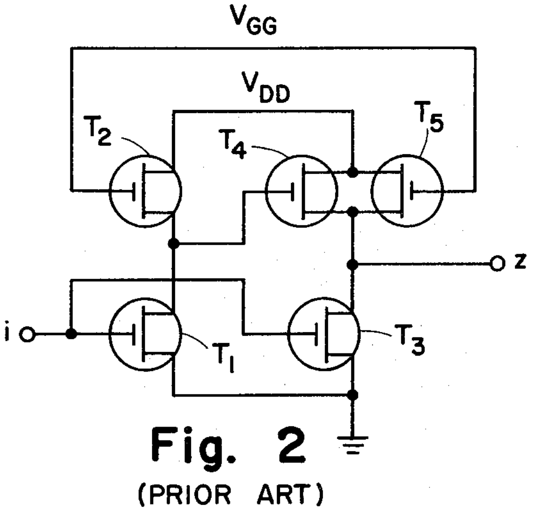
Fig. 2 (PRIOR ART)

A second circuit which has been proposed is shown in FIG. 2. This circuit is essentially the same as that shown in FIG. 1 with the exception that transistor $T_5$ is inserted across transistor $T_4$ as shown. The gate voltage $V_{GG}$ applied to the gate of transistor $T_2$ is also applied to the gate of transistor $T_5$. Transistor $T_5$ is also chosen so DD that transistors $T_3$ and $T_5$ constitute a ratio inverter. Assuming again that the input signal $i$ is either 0 or 1, when the signal is 1 transistors $T_1$ and $T_3$ will conduct. $T_1$ and $T_2$ form a ratio inverter thereby disabling transistor $T_4$ as in the circuit of FIG. 1. Also, since transistors $T_3$ and $T_5$ form a ratio inverter, the node at the source electrode of transistor $T_5$ is 0 and therefore the output voltage $z$ is 0. When $i$ goes to 0, transistors $T_1$ and $T_3$ are disabled and the node at the gate of transistor $T_4$ now charges to $V_{DD}$. Therefore, the output z will quickly swing to the voltage $V_{DD} - V_T$ as in FIG. 1. However, transistor $T_5$ is also conducting and since the gate voltage $V_{GG}$ is considerably smaller than $V_{DD}$, $T_5$ permits the output voltage z to continue to full supply voltage $V_{DD}$. This circuit is quite effective if the relationship between $V_{GG}$, $V_{DD}$, and $V_T$ are as required for FIG. 1 (i.e. $V_{GG}$ is less than or equal to $V_{DD} + V_T$), but if $V_{GG}$ is required to be large and of the same magnitude as $V_{DD}$, the full supply voltage cannot be realized at $z$. Considering the circuit of FIG. 1, if $V_{DD}$ equals $V_{GG}$, then the threshold voltage of transistor $T_2$ will also be significant and the output z will now only be $V_{DD} - 2\ V_T$ (assuming that the threshold voltage of transistor $T_2$ is of similar magnitude to $V_T$, the threshold voltage of transistor $T_4$). In the circuit of FIG. 2, wherein the output voltage is effectively dependent upon transistor $T_5$, the output voltage will now be $V_{DD} - V_T$. Clearly, this is a severe restriction of a low supply voltage is required.

Figure 3:
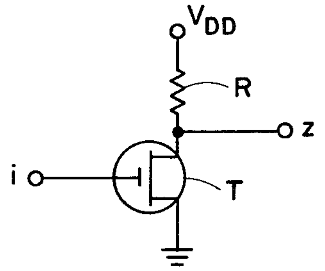
Fig. 3 (PRIOR ART)
FIG. 3 shows a prior art circuit for resistively coupling the supply voltage to the output voltage in order to ensure the full swing to the supply voltage.

In order to ensure a full swing to the supply voltage, a diffused resistor R may be employed, as shown in FIG. 3. The resistor R constitutes a ratio inverter when taken in conjunction with the pull-down transistor T. However, being a ratio circuit, the resistor R must have a fairly high value in order that the pull-down transistor T be kept to a reasonable size. There is therefore a high output impedance looking back at the supply $V_{DD}$ and the charging time constant for the output voltage $z$ is therefore significantly increased. The charging time problem does not of course exist with the circuits of FIGS. 1 and 2 since both circuits have low output impedance to ground and supply.

Figure 4:
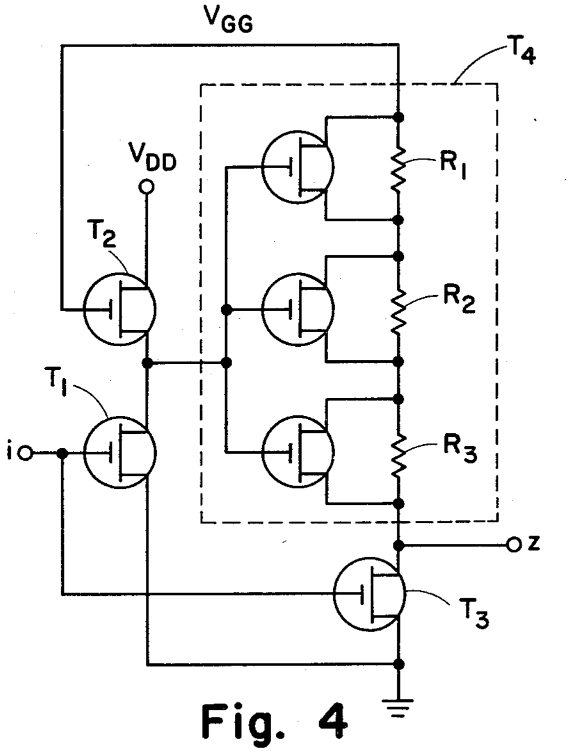
FIG. 4 shows a circuit in accordance with the present invention and including FET devices.

The advantages of the low output impedance push-pull circuits of FIGS. 1 and 2 and the diffused resistive load concept shown in FIG. 3 are combined as shown in FIG. 4, to provide a distributed load current driver according to the invention. Assuming again that the input $i$ is either 0 or 1, when the input is 1, $T_1$ and $T_3$ conduct. Transistors $T_1$ and $T_2$ form a ratio inverter so that the node on the gate of transistor $T_4$ is 0 and $T_4$ is therefore disabled. Also, the series resistance R constituted by resistors $R_1$, $R_2$ and $R_3$ forms a ratio inverter with transistors $T_3$ and as in circuit shown in FIG. 2, the output node of $z$ is 0. When the input $i$ is 0, $T_1$ and $T_3$ are disabled. The node on the gate of transistor $T_4$ is now at $V_{DD}$ which enables $T_4$. There is now a parallel conductive path shunting much of the diffused resistor R. Thus, a low output impedance now looks back at the supply and the output impedance to ground through $T_3$ is low, so that the charging time constant for the output voltage $z$ is low. It may be noted that in this embodiment, $V_{GG}$ is taken as the supply voltage to which the output voltage $z$ swings, since in the present case $V_{GG}$ is a more negative voltage than $V_{DD}$. Thus, z is able to swing to the full supply voltage by virtue of the conductive path through $T_4$ and because of the low impedance of this path, the charging time constant is greatly reduced.

Figure 5:
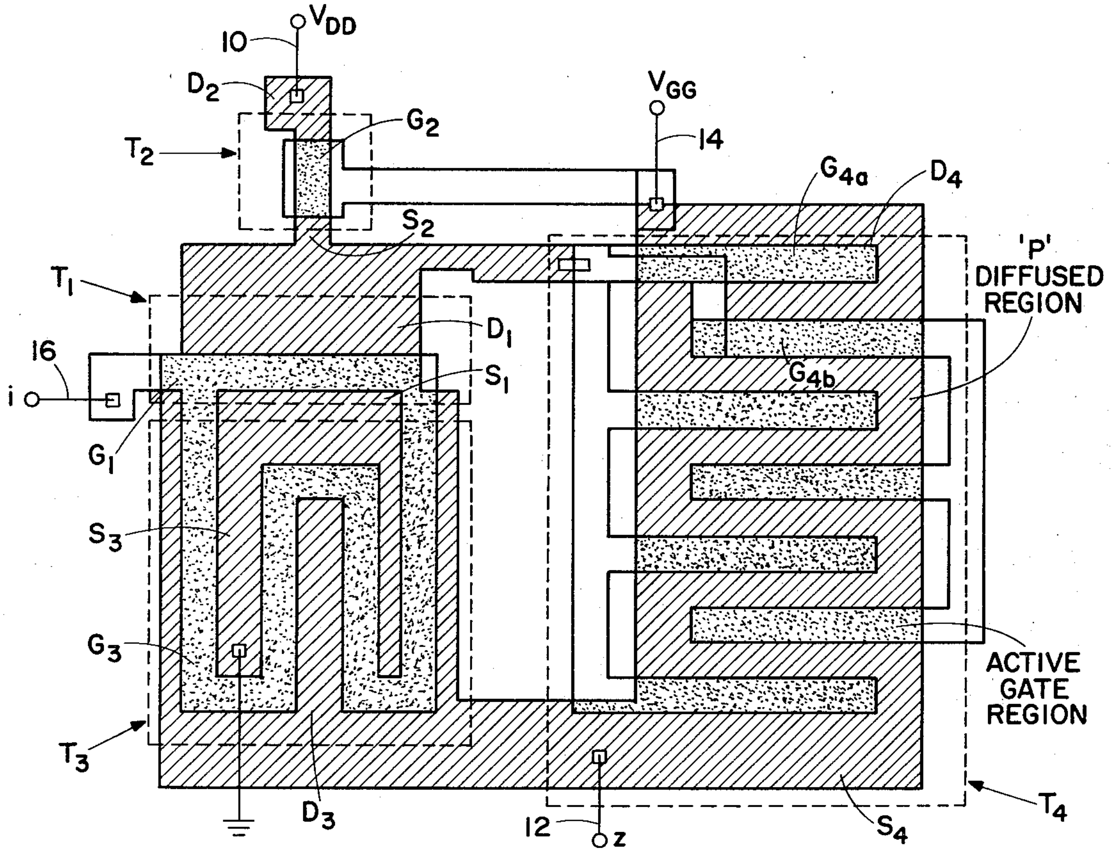
FIG. 5 shows a plan view of a silicon slice embodying the circuit of FIG. 4.

FIG. 5 shows how this circuit may be realized conveniently on a silicon slice. The device shown is a silicon-gate P-channel device, and the crosshatched areas indicate the diffused P regions whilst the dotted areas show the active gate regions. The various areas of the chip which correspond to transistors $T_1$ to $T_4$ of the circuit shown in FIG. 4 are also indicated by the dotted lines and same designations as employed in FIG. 4. Voltage $V_{DD}$ is applied to the drain $D_2$ of transistor $T_2$ by means of the lead-in 10. The source $S_2$ of $T_2$ communicates with the drain $D_1$ of transistor $T_1$, and the source $S_1$ of $T_1$ communicates with the source $S_3$ of transistor $T_3$. $S_1$ and $S_3$ are both at ground potential. The drain $D_3$ of transistor $T_3$ communicates with the source $S_4$ of transistor $T_4$ which is connected to the output $z$ by means of the lead 12. The drain $D_4$ of transistor $T_4$ is connected to supply voltage $V_{GG}$ by means of the lead 14. Considering the various gate regions of the devices, gate $G_2$ of transistor $T_2$ is connected to drain $D_4$ and is also connected to the supply voltage $V_{GG}$ through the lead 14. The gate $G_1$ of transistor $T_1$ is connected through lead 16 to the input $i$ and it may be noted that gate $G_1$ is formed as part of same active gate layer as gate $G_3$.

Turning now to transistor $T_4$, the active gate region of this device is actually formed of two interconnected and intermeshed layers $G_{4a}$ and $G_{4b}$ of generally comb-like shape, spaced to form a meandering path of P-diffused material between the "comb teeth" of the layers $G_{4a}$ and $G_{4b}$, which path constitutes the drain $D_4$ and the source $S_4$ of transistor $T_4$. The gate region $G_{4a}$ is connected to the source region $S_2$ of resistor $T_2$.

Figure 6:
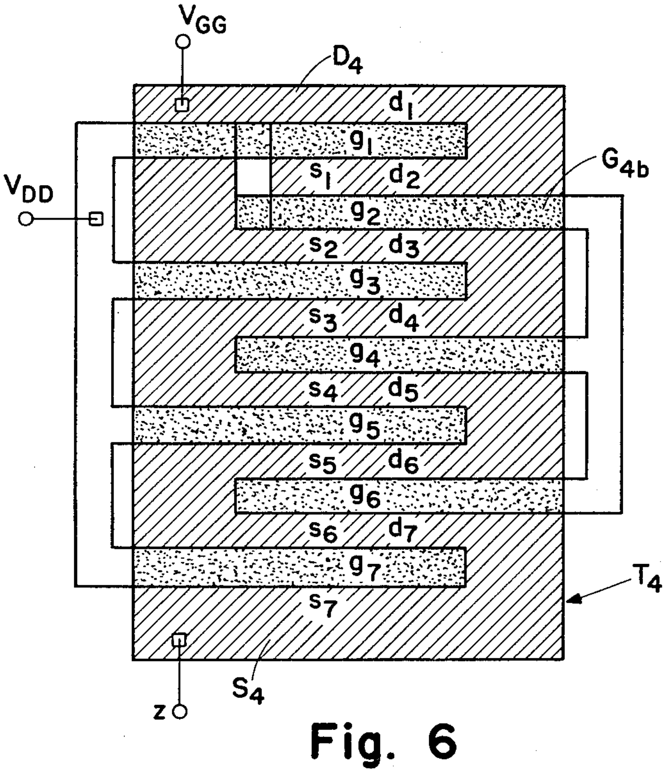
FIG. 6 is a plan view of the distributed load device forming part of the circuitry on the slice shown in FIG. 5.

For a better understanding of the functioning of the device $T_4$, reference is now made to FIG. 6. Again, the P-diffused region is shown by crosshatching and the dotted area is the active gate region. When $T_4$ is disabled, there is a relatively high impedance path between the supply voltage $V_{GG}$ and the output z constituted by the meandering P-diffused path between the fingers of the gate areas $G_{4a}$ and $G_{4b}$. Thus, this constitutes the resistance R of FIG. 4, which in conjunction with transistor $T_3$ forms a ratio inverter. As explained with reference to FIG. 4, in this condition the output voltage at $z$ is at 0. When $T_4$ is enabled by the application of voltage $V_{DD}$ to the gate regions thereof, a number of localized transistors are triggered into conduction, these being constituted by the "teeth" of the gates $G_{4a}$ and $G_{4b}$ which in themselves form individual gate regions $g_1$ to $g_7$ inclusive, on each side of which are drain and source areas shown as $d_1$ to $d_7$ inclusive and $s_1$ to $s_7$ inclusive. Thus, the resistive path caused by the meandering P-diffused region is now largely shunted out by the parallel conductive path between the respective drain and source region of the localized devices. Therefore, a relatively low impedance path now exists between the supply voltage $V_{GG}$ and the output $z$ which not only enables the charging time constant to be quite low but also permits the voltage at $z$ to swing to the full supply voltage $V_{GG}$ as explained in connection with FIGS. 3 and 4.

Figure 7:
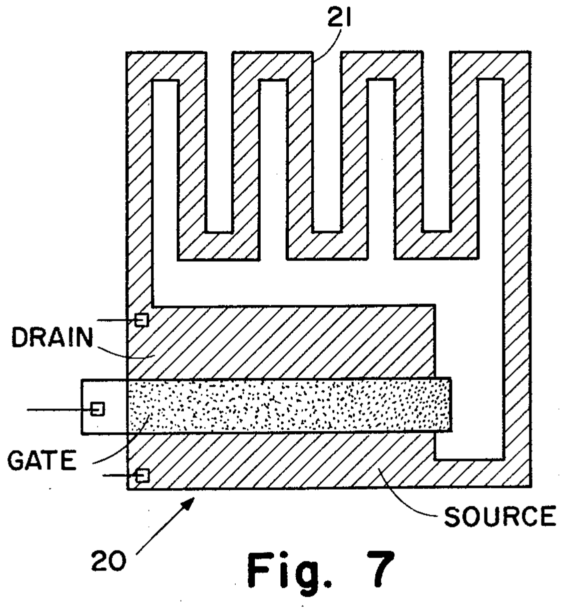
FIG. 7 is a plan view of a further embodiment of the invention.

FIG. 7 shows a further embodiment of the invention wherein the resistive path 21 does not form the local drain and source regions of the device 20, but is diffused or deposited in a meandering pattern on the chip adjacent the device. This arrangement has the advantage of being compact in that since there are no gate regions between successive meanders, the path can be made quite thin and closely spaced. In a further embodiment, polysilicon may be used as the resistive medium, this material having approximately three times the sheet resistivity of diffused silicon.

It will be realized that whilst in this specific embodiment we have employed a silicon-gate MOS device, any type of field effect device may be utilized in the invention, and it will be further realized that the specific configuration shown in FIG. 6 forming a meandering path constituting the source and drain regions of the device is by no means to be considered limiting upon the invention. Furthermore, it will be appreciated that in the arrangement of FIG. 7, since the resistive path does not form the channel of the device, any material of high resistivity may be deposited on the chip to give the resistive path, for example, nichrome. Clearly, various modifications and alternatives of the specific embodiments shown would be readily apparent to those skilled in the art without departing from the spirit and scope of the invention.

What is claimed is:

1. A push-pull current driver circuit comprising a first insulated-gate field effect device comprising a plurality of gate, source and drain regions and a diffused high-impedance resistive path between source and drain electrodes for said device, said path meandering between said gate regions and constituting drain and source regions adjacent said gate regions in such manner that upon turn-on of said device, said high-impedance path is shunted by channel regions underlying said gate regions between said source and drain regions of said device and further comprising second, third, and fourth field effect devices, said second device and said diffused high-impedance resistive path of said first device constituting a first ratio inverter, and said third and fourth devices constituting a second ration inverter, means connected to the source electrodes of said second and fourth devices for connection to reference ground potential, means connected to the gate electrodes of said second and fourth devices for connection to an input signal supply means, means connected to the drain electrode of said first device for connection to first drain potential supply means, means connected to the drain electrode of said third device for connection to second drain potential supply means, means connected to the gate electrode of said third device for connection to gate potential supply means, means connecting the gate regions of said first device to the source electrode of said third device, and means for deriving an output signal from the output of said first ratio inverter at the source electrode of said first device.

2. The push-pull current driver circuit of claim 1 wherein said first drain potential supply means and said gate potential supply means are one and the same.

3. The push-pull current driver circuit of claim 1 wherein said gate regions are formed from two interconnected and interdigitated spaced generally comb-like regions defining said meandering path therebetween.

* * * * *